United States Patent [19]

Winston et al.

[11] Patent Number: 5,537,991
[45] Date of Patent: Jul. 23, 1996

[54] NONIMAGING SOLAR COLLECTOR

[75] Inventors: Roland Winston, Chicago, Ill.; William Duff, Fort Collins, Colo.; Joseph O'Gallagher, Flossmoor; David G. Jenkins, Chicago, both of Ill.

[73] Assignee: Solar Enterprises International, LLC, Chicago, Ill.

[21] Appl. No.: 363,610

[22] Filed: Dec. 23, 1994

[51] Int. Cl.[6] .................................................... F24J 2/10
[52] U.S. Cl. ...................... 126/657; 126/660; 126/907; 126/658
[58] Field of Search ................................ 126/657, 652, 126/653, 654, 658–662

[56] References Cited

U.S. PATENT DOCUMENTS

| 4,286,580 | 9/1981 | Sitnam | 126/657 |
| 4,397,304 | 8/1983 | Villain | 126/658 |

FOREIGN PATENT DOCUMENTS

| 4805 | 10/1979 | European Pat. Off. | 126/657 |
| 184445 | 10/1983 | Japan | 126/661 |
| 60-78251 | 5/1985 | Japan | 126/658 |

OTHER PUBLICATIONS

"Scrambling Light: BIG Is the Operative Adjective in Describing Nonimaging Optics, and Industry Is Waiting for It To Reach Commercialization," Compressed Air, vol. 99, No. 8, Dec. 1994, pp. 14–19.

"Optimization of $SiO_2$–$TiN_xO_y$–Cu Interference Absorbers: Numerical and Experimental Results," M. Lazarov et al, Proc. SPIE 2017, 'Optical Materials Technology for Energy Efficiency and Solar Energy Conversion XII', 1993, 12 pages.

"Improved Selective Properties of $SiO_2$/$TiN_xO_y$–Al Tandem Absorbers Effected By Tempering," H. Schellinger, et al, Proc. SPIE 2255, 'Optical Materials Technology for Energy Efficiency and Solar Energy Conversion XIII', 1994, 10 pages.

"Very Low Emittance Solar Selective Absorber Coatings," Qi–Chu Zhang, et al, 1993 International Solar World Congress, Budapest, 6 pages.

*Primary Examiner*—Carroll B. Dority
*Attorney, Agent, or Firm*—Reinhart, Boerner, Van Deuren, Norris & Rieselbach

[57] ABSTRACT

A nonimaging solar collector. A method and article of manufacture of a solar collector includes an outer housing transparent to light, a reflector element positioned within the outer housing, an absorber concentrically disposed relative to the outer housing, and a heat conduction fin coupled to the absorber and having a wedge shape which tapers to a smaller thickness as a function of increasing radial separation from the absorber.

18 Claims, 4 Drawing Sheets

5,537,991

NONIMAGING SOLAR COLLECTOR

The present invention is concerned with a nonimaging concentrator for light. More particularly, the invention is concerned with a solar energy concentrator or collector having an absorber concentrically disposed with a glass housing enabling nonimaging light concentration, such as a evacuated cylindrical reflector tube. This absorber geometry also includes a gap loss reduction V groove which is positioned in a complementary manner relative to a wedge shaped heat conductor fin coupled to the absorber.

Nonimaging concentrators and their advantages are well known in the art (see, for example, U.S. Pat. Nos. 3,957,031; 4,002,499; 4,003,638; 4,230,095; 4,387,961; 4,359,265; and 5,289,356 incorporated by reference herein). In these previous methodologies, the device is constructed using a given absorber shape, usually a cylindrical tube, and then the appropriate nonimaging reflector is designed. This emphasis was therefore primarily on developing new reflector designs to optimize collector efficiency. There has recently been made available new types of high performance absorber materials which can even be disposed on flexible substrates. These absorbers have an absorbtance typically greater than 90% over the solar spectrum, while the hemispherical emittance at operating temperatures is quite low.

It is therefore an object of the invention to provide an improved nonimaging solar collector and method of use thereof.

It is another object of the invention to provide a novel nonimaging solar collector having an absorber concentrically disposed within a glass housing enabling nonimaging light concentration.

It is a further object of the invention to provide an improved nonimaging solar collector having an outer housing and a concentrically disposed tubular absorber with a radially coupled wedge shaped heat conduction fin.

It is also an object of the invention to provide a novel nonimaging solar collector having a cylindrical reflector and tubular absorber coupled to a conically shaped cross sectional heat conductor.

It is yet another object of the invention to provide an improved solar collector having an absorber concentrically disposed within a reflector and coupled conical cross section heat conductor.

It is still a further object of the invention to provide a solar collector utilizing absorbers having high efficiency and which are disposable on flexible substrates designed to optimize collection properties.

It is another object of the invention to provide a method and article of manufacture for providing high solar collector efficiency with a concentric heat exchange channel design which enables easy construction and assembly without need for solar tracking drives.

Other objects and advantages of the invention will be apparent from the detailed description and drawings described hereinbelow.

DETAILED DESCRIPTION OF PREFERRED EMBODIMENTS

Figure 1:
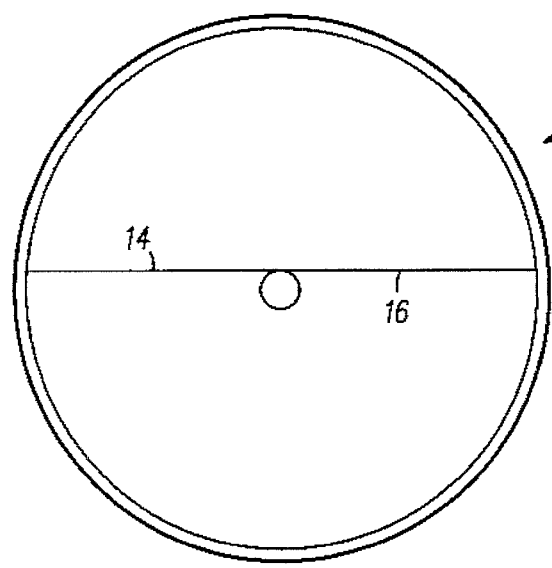
FIG. 1 illustrates a prior art solar collector with a flat fin conductor.
Figure 2:
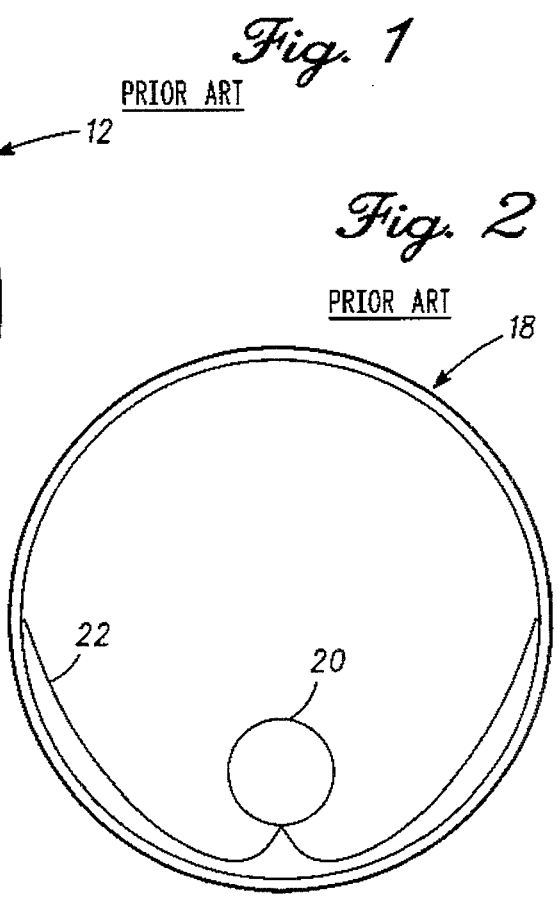
FIG. 2 illustrates a prior art nonimaging solar collector of 35° acceptance angle with an absorber disposed noncentrically within a cusp shaped reflector.

A nonimaging solar collector constructed in accordance with the invention is shown in FIGS. 3–6 and indicated generally at 10. Several prior art collector designs are shown for comparison in FIGS. 1 and 2. The prior art collector 12 of FIG. 1 has heat conductor fins 14 and 16 which both radiate heat so that thermal performance is poor at temperatures above about 100° C. Prior art nonimaging collector 18 of FIG. 2 has relatively good thermal performance at elevated temperatures, but absorber 20 is noncentrically disposed and requires manufacture of a somewhat intricate reflector geometry 22.

The inventive nonimaging solar collector 10 includes an outer glass tube housing 24 which is transparent, allowing entry of light rays 26 (see FIG. 3B) into the evacuated interior of the housing 24. The housing 24 is shown as cylindrical in shape but can take on other geometries suitable for the functions described herein. The light rays 26 either directly strike absorber tube 28 or reflect from reflector surface 32 to impinge upon the absorber tube 28 and thereby concentrate the collected light. In the preferred embodiment this absorber tube 28 can be shapes other than shown in the figures but is concentrically positioned relative to the housing 24. The absorber tube 28 further can include a wedge shaped heat conductor 30 (see FIG. 3C) which in cross-section collectively appears with the absorber tube 28 as an "ice cream cone" geometry, as noted in FIGS. 3A, 3B, 4 and 5.

Figure 3B:
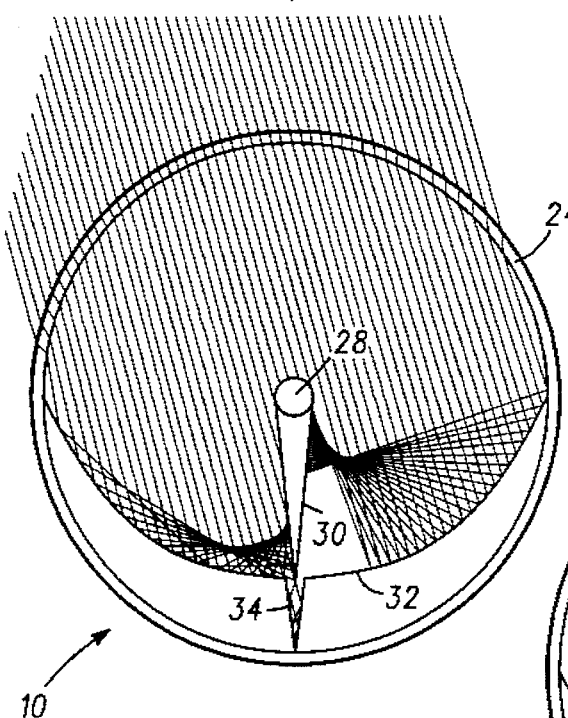
FIG. 3B shows a ray trace for the collector of FIG. 3A.
Figure 3A:
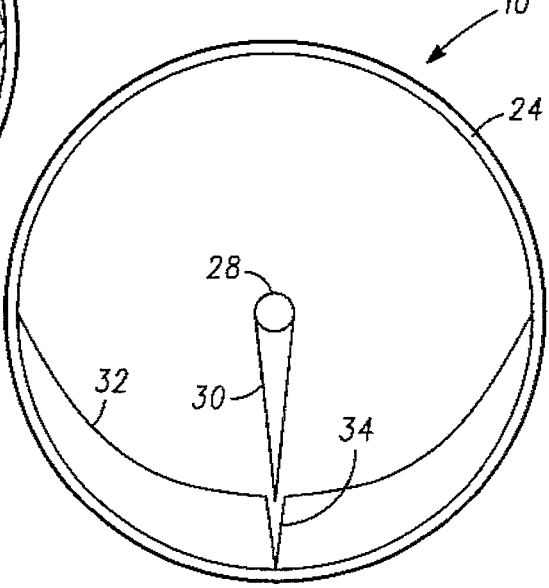
FIG. 3A illustrates a cross-sectional view along 3A—3A on FIG. 3D of a nonimaging solar collector having an absorber concentrically disposed within a cylindrical reflector with a V-groove gap loss suppresser and the absorber further includes a coupled heat conductor fin having a conically shaped cross section.
Figure 3C:
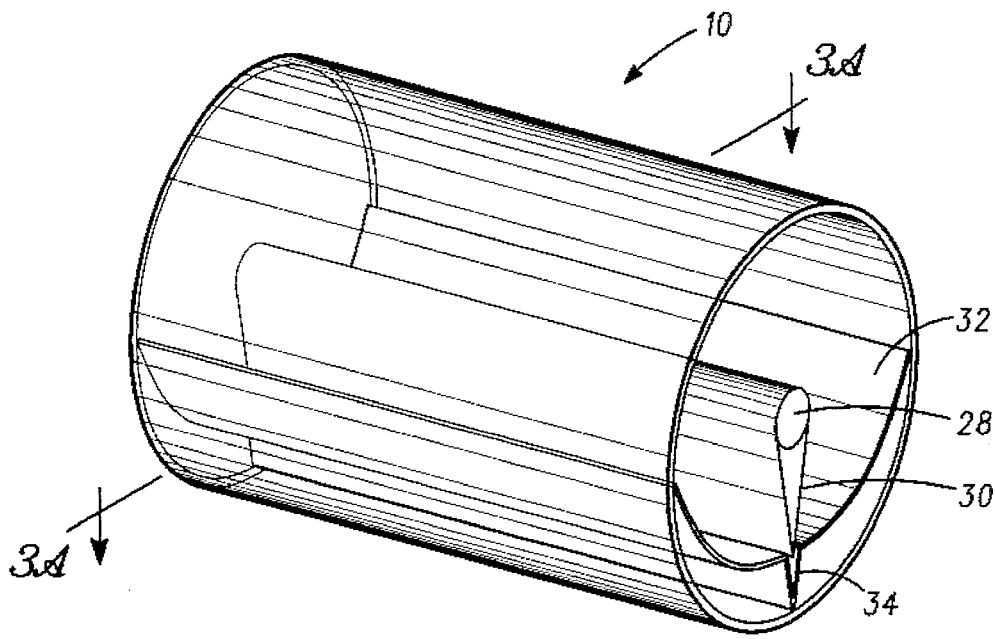
FIG. 3C illustrates a perspective view of the solar collector of FIG. 3A.
Figure 3D:
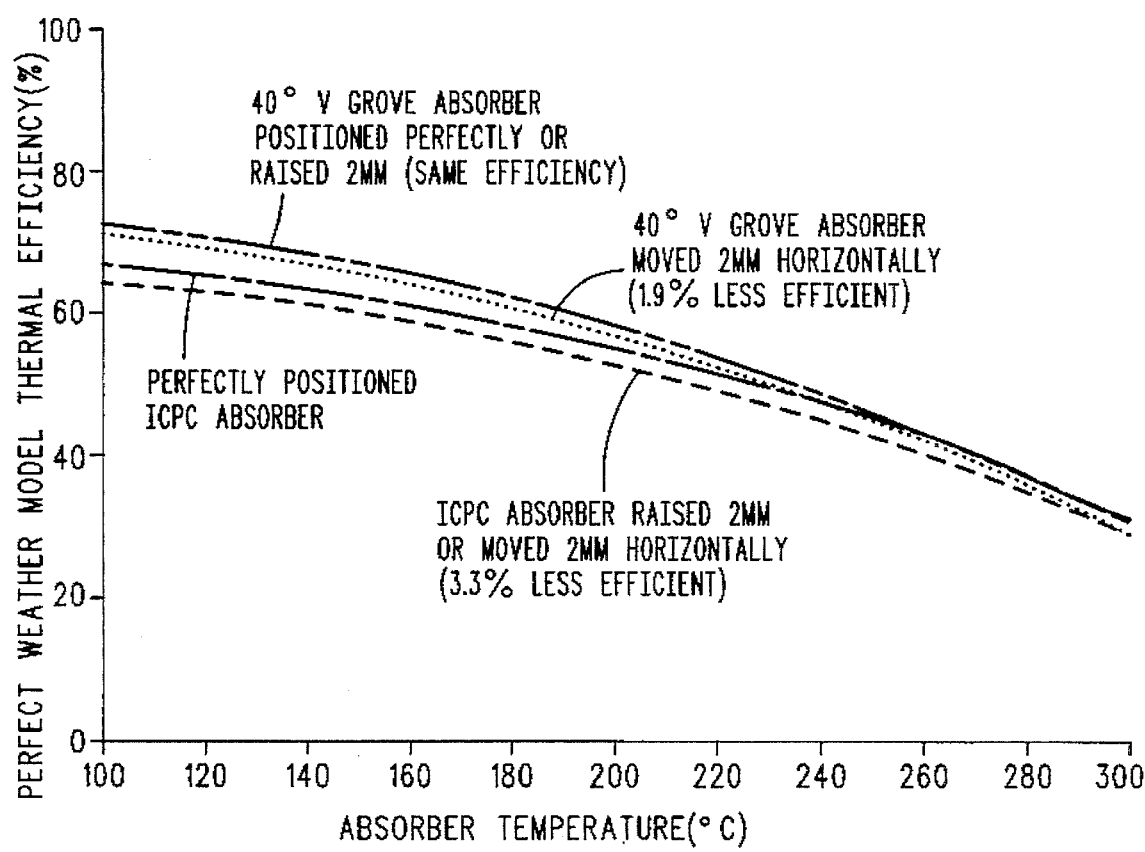
FIG. 3D illustrates a plot of thermal performance of the 40° V-groove collector of FIG. 3A and the 35° ICPC collector of FIG. 2 when displaced from ideal positioning.

In a preferred embodiment (see FIGS. 3, 4 and 5) reflector surface 32 includes a gap loss reduction V-groove 34. This groove 34 suppresses energy absorption gap loss which would otherwise occur when there is a space between the reflector surface 32 and the wedge shaped heat conductor 30. In FIG. 3A the angle of acceptance for the absorber is about 40° which would make the collector 10 suitable for east-west orientation without need of any solar tracking mechanism. This particular angular acceptance with the associated V-groove 34 provides excellent tolerance for vertical positioning errors in placement of the absorber 30, as well as good tolerance for horizontal displacements (see FIG. 3D).

Figure 4:
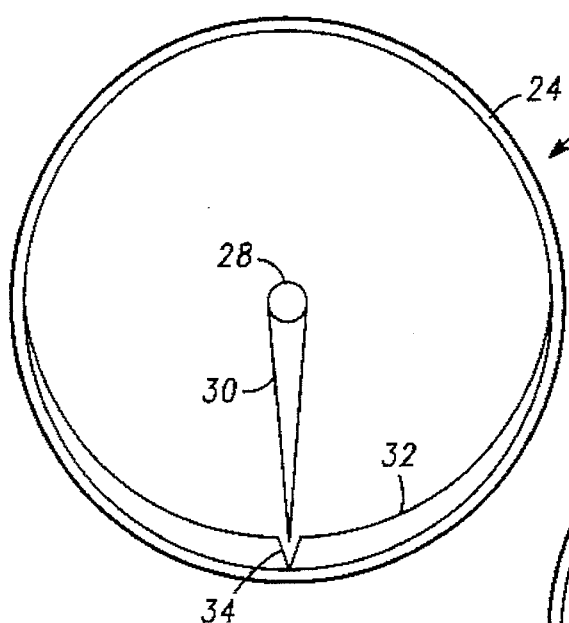
FIG. 4 illustrates another version of the collector of FIG. 3 but with increased angle of acceptance.

The collector 10 of FIG. 4 has a smaller radius of curvature for the reflector surface 32, resulting in a wider, 70° angle of acceptance. This embodiment would allow the collector 10 to be suitable for north-south or east-west orientation without need of any solar tracking device.

Figure 5:
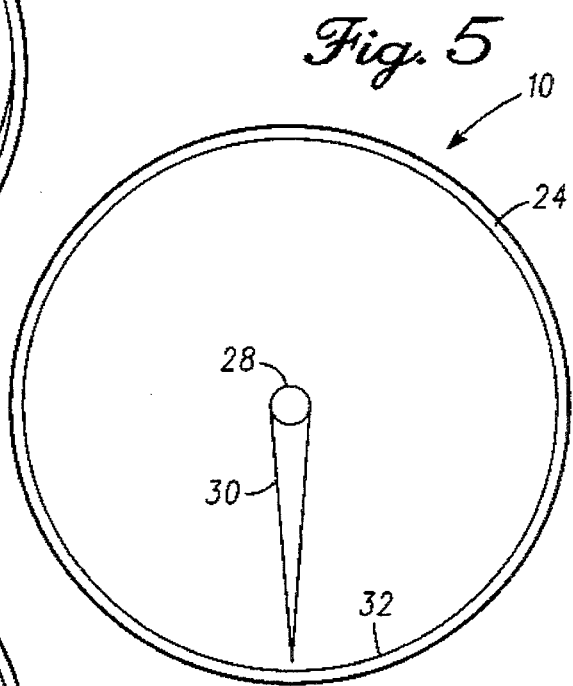
FIG. 5 illustrates a variation on the solar collector of FIG. 3 but without the V-groove gap loss suppresser element.

The collector 10 of FIG. 5 is the limiting case of the embodiments of FIGS. 3 and 4 where the radius of curvature of the reflector surface 32 is coincident with the inner surface of the glass tube housing 24. This embodiment has an acceptance angle approaching 90°. This form of the collector 10 further simplifies the construction procedure for manufacture of the collector 10.

Figure 6A:
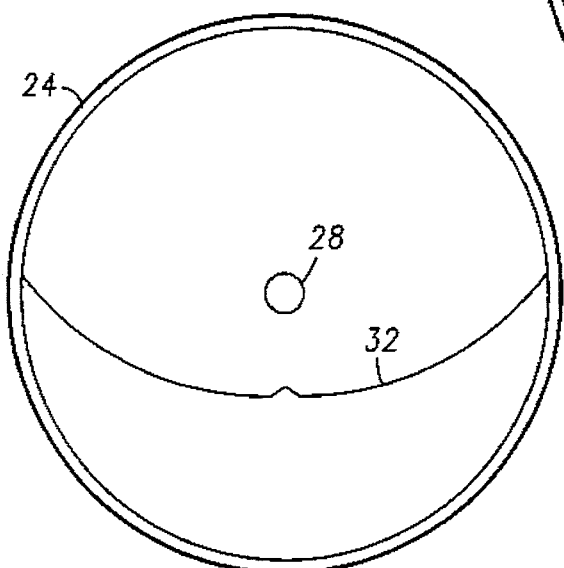
FIG. 6A illustrates a nonimaging collector with a concentric tubular absorber and raised reflector contour providing a five degree acceptance angle and FIG. 6B illustrates a ray trace for the collector of FIG. 6A.
Figure 6B:
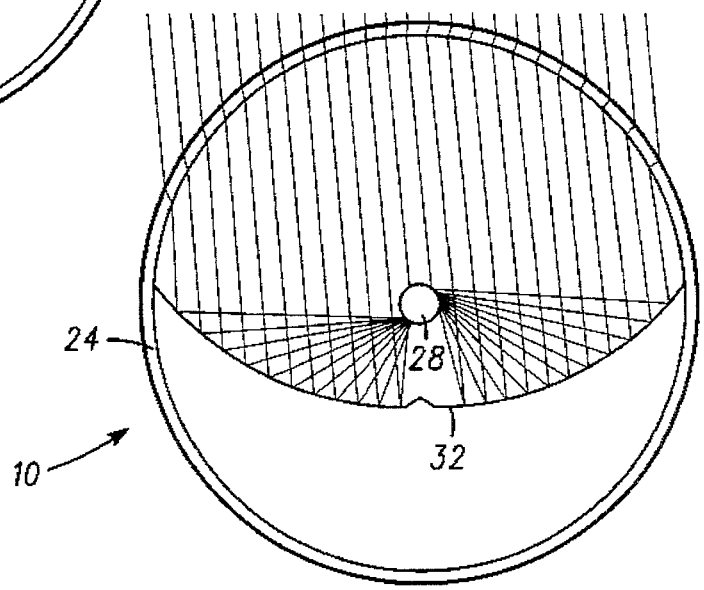
Figure 7:
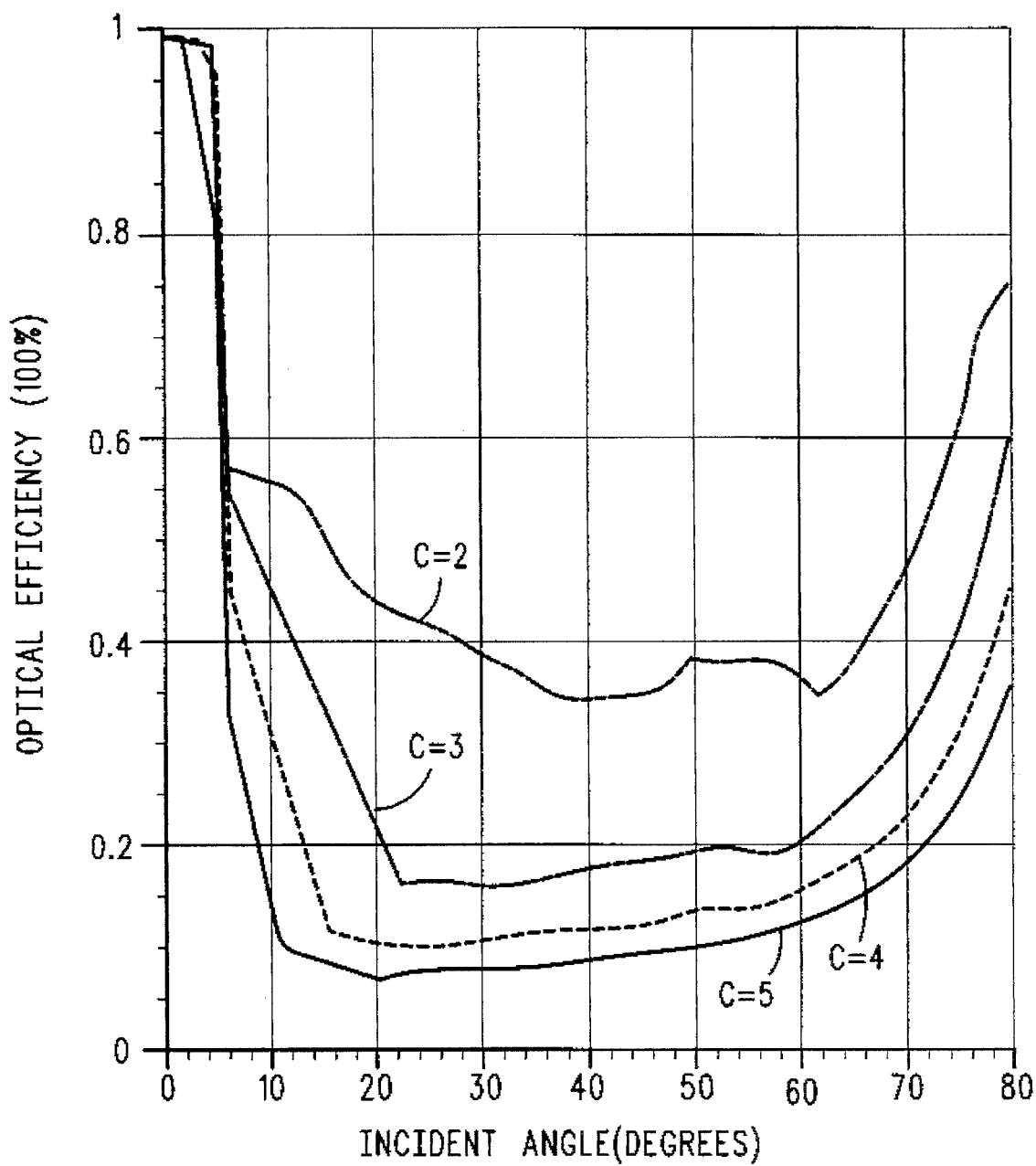
FIG. 7 illustrates angular acceptance properties of the collector of FIG. 6.

In the embodiment of FIGS. 6A and 6B, the reflector surface 32 has a relatively large radius of curvature such that the angle of acceptance is about 5° and would require some crude solar tracking device, operative either continuously or intermittently. This design includes a small cusp arising from the small angle of acceptance. The thermal performance is quite good at elevated temperatures. FIG. 7 shows the efficiency versus incident angle of the embodiment of FIG. 6 for concentration factors of two, three, four and five with reflection or Fresnel losses ignored. Concentrations of about four are achieved with efficient 5° acceptance properties.

Thermal performance for the illustrated embodiments of the figures are shown in Table I below. Calculations have been performed based on an average meteorological year in Albuquerque, N.M. The emittance assumed for the absorber is 0.05 at T=100° C. and an absorbtance of 0.95.

(about 0.92) over the solar spectrum. Cermets are conventional materials which have layers of dielectric materials which contain a particular fraction of metal composition disposed on a metal reflector layer having an anti-reflection coating. The top layers have lower metal fractions in the dielectric material than those layers below them. The higher metal fraction layer at the bottom absorbs more energy because visible light passes through the top layers easily. The emission of black body radiation (>2 mm wave length) is however reflected by the cermet dopant quite efficiently. Thus, emission of radiation from the bottom layer is trapped inside the absorber material, and only the low doped top layer radiates away heat. The graded metal content increases the amount of atoms seen by the incoming light so more is absorbed and also reduces the number of atoms which can radiate away heat.

Another class of materials useful as absorbers are certain ceramics which can easily be made using vacuum deposition. For example, conventional layers of $TiN_xO_y$ and $SiO_2/TiN_xO_y$ can be deposited onto an aluminum or copper substrate until a set amount of accumulation has been measured. Both of these types of materials have a $TiN_xO_y$ layer about 53 nm thick on a substrate. The second type of absorber material has a 90 nm layer of $SiO_2$ added. The thermal properties of such materials are very favorable for use as solar absorbers. On copper substrates an absorbtance of 0.90 or higher can be achieved with an emittance of 0.06

TABLE I

| Property | Thermal Performance | | | | | |
| --- | --- | --- | --- | --- | --- | --- |
| | 5° ICPC (FIG. 6) | 40° ICPC (FIG. 2) | 40° VG (FIG. 3) | 70° VG (FIG. 4) | 90° Circle (FIG. 5) | Flat Fin (FIG. 1) |
| Concent. | 4.00 | 1.47 | 1.16 | 1.01 | 0.94 | 0.46 |
| Gaploss | ~0% | 0% | 0.25% | 0.5% | 4% | 4% |
| Thermal Efficiency (T = 100 C.) | 82.4 | 62.6% | 67.4% | 70.1% | 68.5% | 64.6% |
| Thermal Efficiency (T = 150 C.) | 79.7 | 57.6% | 61.0% | 62.7% | 60.6% | 50.8% |
| Thermal Efficiency (T = 200 C.) | 76.1 | 50.8% | 52.2% | 52.5% | 49.8% | 32.8% |
| Thermal Efficiency (T = 250 C.) | 71.1 | 42.0% | 40.8% | 39.3% | 35.9% | 12.7% |
| North South Orientation Allowed | Required | No | No | Yes | Yes | Yes |
| Need Reflector Insert | Yes | Yes | Yes | Yes | No | No |
| Reflector Silvering Required | Yes | Yes | Yes | Yes | Yes | No |
| Concentric Glass-to-Metal Seals | Yea | No | Yes | Yes | Yes | Yes |
| Shaping of Glass Tube Allowed | Yes | Yes | No | No | Yes | Yes |
| Active Tracking Required | Yes | No | No | No | No | No |

In construction of the collector 10, it is also preferable to utilize several classes of high performance solar absorber coatings on the absorber tube 28 and the heat conductor 30. Coatings can be, for example, cermets having a very low emittance (about 0.02 at 20° C.) and a high absorbtance at T=200° C. while aluminum substrates achieve absorbtance as high as 0.95 and an emittance of 0.03 at T=100° C.

The above described preferred embodiments utilize a concentrically disposed absorber tube within a cylindrical reflector housing which has been evacuated. The absorber tube further includes a wedge shaped heat conduction fin coupled to the absorber, and preferably includes an absorber layer (absorbtance greater than 0.90) with low emittance (less than about 0.05) to achieve a very efficient solar collector. The simplicity of this basic design allows easy manufacturing, reducing construction costs thereby making solar collector usage more practical.

Further advantages and features of the invention will be appreciated by reference to the claims set forth hereinafter. While preferred embodiments have been described, it will be clear to those of ordinary skill in the art that changes and modifications can be made without departing from the spirit and scope of the invention in its fullest aspects.

What is claimed is:

1. A nonimaging solar collector, comprising:
   an outer housing at least partially transparent to light and having an outer housing geometry;
   a reflector element disposed within said outer housing;
   an absorber disposed within said outer housing and having an absorber housing geometry concentrically oriented therein relative to said outer housing geometry; and
   a heat conductor fin coupled to said absorber and having a wedge shape tapering to lesser thickness as a function of increasing radial separation from said absorber.

2. The solar collector as defined in claim 1 wherein said outer housing is sealed and evacuated.

3. The solar collector as defined in claim 1 wherein said outer housing comprises a transparent glass.

4. The solar collector as defined in claim 1 wherein said outer housing comprises a cylindrically shaped element.

5. The solar collection device as defined in claim 4 wherein said absorber comprises a tubular shaped element.

6. The solar collector device as defined in claim 1 further including an element as part of said reflector element, said element comprised of a sharp V-groove concavely disposed relative to said absorber.

7. The solar collector device as defined in claim 6 wherein said heat conductor fin includes a tapered end and said V-groove element is symmetrically disposed relative to the tapered end of said heat conduction fin.

8. The solar collection device as defined in claim 7 wherein the tapered end extends into said V-groove element.

9. The solar collection device as defined in claim 8 wherein said collection device has an angle of acceptance of 40° and the tapered end extends about 2 mm into said V-groove element.

10. The solar collection device as defined in claim 8 wherein said collection device has an angle of acceptance of 70° and the tapered end extends about 1 mm into said V-groove element.

11. The solar collector as defined in claim 1 wherein said reflector element comprises a reflective layer disposed on a substrate positioned within said outer housing.

12. The solar collector as defined in claim 11 wherein said reflective layer substrate comprises a radius of curvature greater than that of said outer housing.

13. The solar collector as defined in claim 11 wherein said outer housing has an inner wall and said reflective layer substrate comprises a radius of curvature of said inner wall.

14. The solar collector as defined in claim 1 wherein said absorber comprises a substrate coated with a highly efficient absorber.

15. The solar collector as defined in claim 14 wherein said highly efficient absorber is selected from the group consisting of a cermet and ceramic materials.

16. The solar collector as defined in claim 15 wherein said ceramic materials are selected from the group consisting of $TiN_xO_y$ and $SiO_2/TiN_xO_y$.

17. The solar absorber as defined in claim 16 wherein said substrate is selected from the group consisting of Al and Cu.

18. The solar collector as defined in claim 15 wherein said cermet comprises a layer structure having a variable fraction of metal content from layer to layer.

* * * * *